US010189244B2

(12) United States Patent
Reichhart

(10) Patent No.: US 10,189,244 B2
(45) Date of Patent: Jan. 29, 2019

(54) METHOD FOR SELECTING A FORMAT FOR A SECTION TO BE PRINTED

(75) Inventor: Dieter Reichhart, Eschweiler (DE)

(73) Assignee: Hewlett-Packard Gesellschaft m.b.H, Vienna (AT)

(*) Notice: Subject to any disclaimer, the term of this patent is extended or adjusted under 35 U.S.C. 154(b) by 1614 days.

(21) Appl. No.: 12/278,652

(22) PCT Filed: Jan. 29, 2007

(86) PCT No.: PCT/EP2007/000733
§ 371 (c)(1),
(2), (4) Date: Aug. 7, 2008

(87) PCT Pub. No.: WO2007/090535
PCT Pub. Date: Aug. 16, 2007

(65) Prior Publication Data

US 2009/0116068 A1 May 7, 2009

(30) Foreign Application Priority Data

Feb. 8, 2006 (DE) ........................ 10 2006 005 634

(51) Int. Cl.
*G06K 15/00* (2006.01)
*B41F 33/00* (2006.01)

(52) U.S. Cl.
CPC .................................... *B41F 33/00* (2013.01)

(58) Field of Classification Search
CPC ....................................................... B41F 33/00
(Continued)

(56) References Cited

U.S. PATENT DOCUMENTS 6,257,142 B1 * 7/2001 Baba ........................ B41F 13/58 101/181
6,441,914 B1 * 8/2002 Barak ...................... B41B 23/00 358/1.1

(Continued)

FOREIGN PATENT DOCUMENTS

DE 19921120 C2 5/2001
EP 0105468 A2 9/1983

(Continued)

OTHER PUBLICATIONS

International Search Report and Written Opinion dated Jan. 11, 2008, issued on PCT Patent Application No. PCT/EP2007/000733 dated Jan. 29, 2007 , European Patent Office.

(Continued)

*Primary Examiner* — Ted Barnes
(74) *Attorney, Agent, or Firm* — HP Inc. Patent Department

(57) ABSTRACT

A method for selecting a format is disclosed by selecting a print section layout, which divides the section to be printed in a running direction and in a transversal direction of the section to be printed into adjacent units with a signature assigned to a unit such that subsequently in the running direction, longitudinal dimensions and in transversal direction, transversal dimensions of the signature and technically required border portions outside of the signature are determined, and subsequently, on the one hand, a minimum longitudinal dimension is calculated as the sum of the longitudinal dimensions of the signature and of required border regions adjoining in running direction, and, on the other hand, a minimum transversal dimension is computed as the sum of the transversal dimensions of the signature and of required border regions, adjoining in transversal direction, and wherein eventually, the print section format is selected so that a longitudinal dimension of the print section (Continued)

Figure 1:
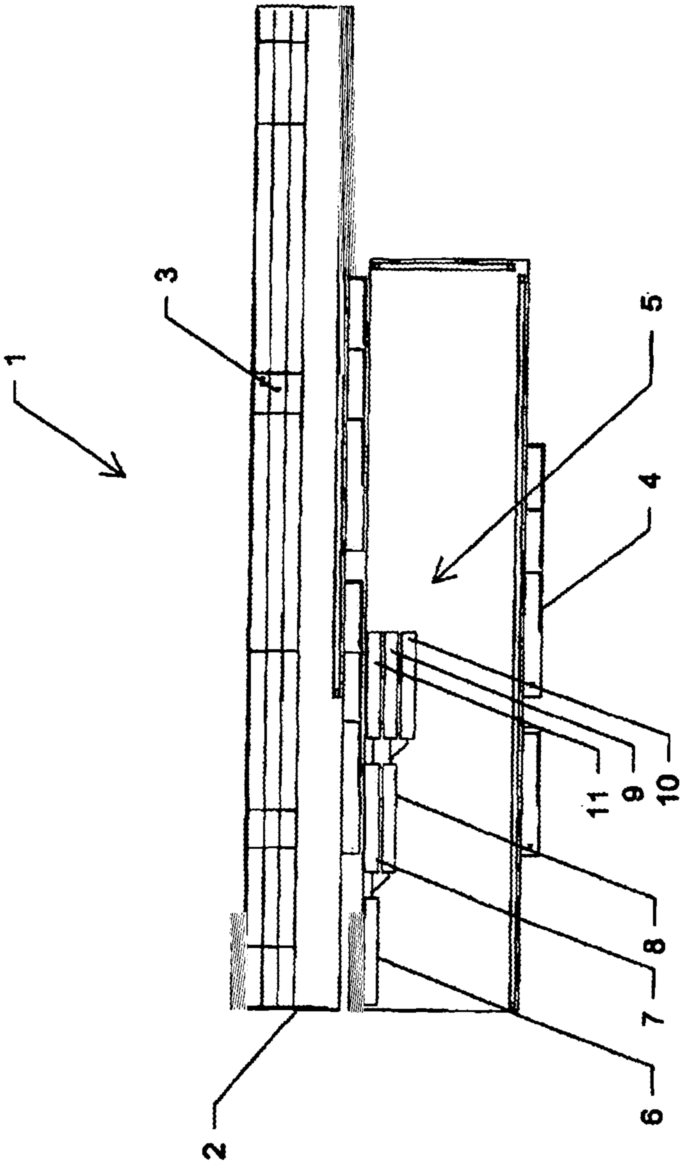

format is at least equal to the minimum longitudinal dimension, and a transversal dimension of the print section format is at least equal to the minimum transversal dimension.

19 Claims, 12 Drawing Sheets

(58) Field of Classification Search

USPC ........ 358/1.2, 1.16, 1.12, 1.18, 1.1, 1.6, 1.9, 358/3.21, 3.23, 3.24, 3.29, 296, 304, 305, 358/1.14, 452, 1.17, 401, 449, 528, 537; 700/1, 2, 5, 6; 412/1, 9, 11, 13, 14, 16, 412/25, 32, 33; 281/2, 3.1, 15.1, 21.1; 270/41, 52.07; 382/112; 715/274

See application file for complete search history.

(56) References Cited

U.S. PATENT DOCUMENTS

| | | | | |
|---|---|---|---|---|
| 7,177,045 B2 * | 2/2007 | Goel | G06K 15/02 | 358/1.18 |
| 7,180,608 B1 * | 2/2007 | Yu | G06F 3/1204 | 358/1.1 |
| 7,333,246 B1 * | 2/2008 | Kowalski | G06K 15/00 | 270/41 |
| 7,436,540 B2 * | 10/2008 | Okamoto | B41J 2/45 | 347/116 |
| 7,777,901 B2 * | 8/2010 | Sano | G06K 15/02 | 358/1.14 |
| 2007/0172284 A1 * | 7/2007 | Tsukamoto | B41J 11/008 | 400/76 |

FOREIGN PATENT DOCUMENTS

| | | |
|---|---|---|
| EP | 0557008 A2 | 2/1993 |
| EP | 1333384 A2 | 1/2003 |
| FR | 2512743 | 9/1981 |
| FR | 2691102 | 5/1992 |
| WO | WO 9842509 | 10/1998 |

OTHER PUBLICATIONS

Wikipedia, “Imposition,” Dec. 5, 2005, <http://en.wikipedia.org/w/index.php?title=Imposition&oldid=30232162>.

* cited by examiner

METHOD FOR SELECTING A FORMAT FOR A SECTION TO BE PRINTED

BACKGROUND OF THE INVENTION

The invention relates to a method for selecting a format for a section to be printed, wherein initially a signature, which comprises pages in a page format of a print product, is disposed on a section to be printed, which comprises the section format, and wherein for producing the print product, the section to be printed is printed and cut, if required, to the signature, and subsequently the signature is collated to form the print product, which is eventually cut to page format.

For producing a multipage print product with generally known print production methods, e.g. in offset-, letterpress-, gravure-, flexo- or digital print, several pages are printed together onto a large format section. For example, a 16-page magazine in DIN A4 format can be printed on a single section in standard format, 63×88 cm (double sided).

In order to produce a print product, the flat paper ware coming from the paper warehouse as a "raw section" is cut, if required, to a section format, which can be processed by the print press, thus to a "section to be printed". The section to be printed can be cut in the further process of the production of the print product into "partial sections". Print- or partial sections are folded as "signatures" in the folding machine or in a folding unit or "broken", and possibly collated into a "raw block", which is eventually stapled e.g. in a gang stitching binder or in a glue binder in a "bind", or bound and cut in a block at the remaining edges.

Through variations of said basic principle, the multitude of known bound print products is created. For example, the block for producing a magazine can be provided with a cover made of a heavier paper provided with a more complex imprint. For producing a book, several raw blocks are bound at a common back through thread stitching.

A signature is folded through cross fold or parallel fold. In cross fold, each additional fold of the section is performed transversal to the preceding fold, in parallel fold, each fold is performed parallel to the preceding fold. In zigzag- or leporello fold, the folds are performed in parallel, but in changing direction. In a wrap fold, the folds are performed in parallel and the paper is wound up. A combination of cross fold and parallel fold is designated as mixed fold.

By folding and breaking, the section is partitioned in "running direction", in which the paper fibers run, and in which the section runs through printing-, folding- and cutting machines, and perpendicular to said direction it is partitioned in "transversal direction". Said partitioning of the section, which is defined by a fold- and break sequence, is designated by the number of the pages of the print product, respectively disposed subsequent to one another in the running direction of a section, or transversal to said running direction. For example, the partitioning for said production of a 16-page A4 magazine on a standard section 63×88 cm in cross fold is designated "4×2" (4 pages in running direction and 2 pages in transversal direction subsequent to one another).

According to said partitioning, the particular pages of the print product are disposed on the required signatures, so that they appear in the print product in the desired sequence and in the correct orientation after folding and collating. The border areas outside of the pages of the print product on the section to be printed, between adjacent pages and about the pages, are used at least partially for binding at one edge of each page; the others are separated in the context of the production of the print product as "cutoff areas" at the latest during the bookbinding process.

The border areas, in particular the cutoff areas, which are not included any more in the finished print product, offer space for the handlers of the print-, fold- and cutting machines during the production process of the print product, for the initial cut and for various elements to be printed, in particular for cut-, print- and register marks and for color- or grayscale calibration stripes, -bars or -wedges, by means of which the print quality of image printing is checked and the exact color composition is adjusted.

The cutoff area of the first page of a section to be printed thus holds e.g. in book printing traditionally the "section standard", thus in abbreviated form, the title with the designation of the edition and the section signature with the running number and the number of the print sheets. Other markers facilitate the handling of the imprinted and/or folded section to be printed. Bar shaped "flutter marks" on each completely folded section back facilitate e.g. the intuitive detection of the correct sequence, when collating the signatures into a gang stitching binder. When the sheets are arranged correctly, the flutter marks are visible in a stair case shape. Small "cut marks" on the section to be printed indicate, at which location the section is to be cut or separated, and "fold markers" indicate, how a section is to be folded.

The position of the pages and of the elements to be printed relative to one another on the section to be printed is designated e.g. as "register sheet", according to Kipphan, handbook of the print media. The selection of formats of the sections to be printed, imposing schemes and register sheets is performed in a generally known manner utilizing highly specialized CAD (computer aided design) systems. Compared to manual layout, such systems have a multitude of advantages. By linking dimensions, CAD systems, on the one hand, offer an automated plausibility control, on the other hand, when a dimension is changed (e.g. the page format), linked dimensions (e.g. the width of the cutoff area, the position and size of a marking) can be automatically adjusted. In particular, imposing schemes can be archived with little effort, and are thus available for later similar applications.

Such a highly specialized CAD system, which supports the manual selection of a format of a section to be printed, by such an archive of specified imposing schemes, is sold e.g. by Kodak und the trade name "upfront". In the known CAD system, imposing schemes are provided in a library as so-called "section plans". For each imposing scheme, the particular dimensions of the sections to be printed and of the signatures, of the particular pages of the print product, of the cutoff areas and of the printing elements and of the non printing, and the position and numbering of the pages are defined on the section.

The selection of a format of a section to be printed and the determination of a register sheet for a particular imposing scheme, which is not defined in the library, for an unusual fold sequence resulting from a special format for a print product with a page format, not defined in the library, or with a non-cataloged page number, requires, when using this system in the most favorable case based on an existing scheme, which is as similar as possible, the manual definition of a new register sheet. The selection of several different possible formats of sections to be printed, and based thereon the generation of several different possible imposition schemes and register sheets, and eventually their comparison, in order to optimize the production of a print product under production, logistical and economic considerations is not economical with the known method.

It is the object of the invention to facilitate an automated determination initially of the format of the section to be printed, of the imposition scheme and of the register sheet.

SUMMARY OF THE INVENTION

Based on the known manual method for selecting a section format from a library, it is proposed according to the invention, that initially a section layout is selected, which subdivides the section to be printed into adjacent units in a running direction and in a transversal direction of the section to be printed, and that the signature is assigned to a unit, so that thereafter, longitudinal dimensions of the signature are determined in the running direction and transversal dimensions of the signature are determined in transversal direction, and of technically required border areas outside of the signature, so that subsequently, on the one hand, a minimum longitudinal dimension is determined as sum of the longitudinal dimensions of the signature and of required border areas adjacent in running direction, and, on the other hand, a minimum transversal dimension is computed as a sum of the transversal dimensions of the signature and of adjacent required border areas in transversal direction, and that eventually the section format is selected, so that a longitudinal dimension of the section format is at least equal to the minimum longitudinal dimension and a transversal dimension of the section format is at least equal to the minimum transversal dimension.

The automated determination of a possible print section format and based thereon, the selection of an optimum print section format when using the manual method, used with the support of the known system, is eventually prevented by the plurality of possible combinations of the relevant parameters of the print product and also of the execution systems, provided for the production of the print product. The selection of a possible print section layout, still without the determination of the exact distances of the pages of the print product on the section to be printed, as the first step of the method according to the invention in actual networked graphic production plants, is typically comparatively simple to automate, since, on the one hand, the number of producible print section layouts is tightly limited, due to technical restrictions of the available execution systems, and, on the other hand, only a further restricted selection of them is suitable for producing the amount of pages desired for an actual print product.

The lengths and widths of the particular technically required border areas according to the specification of the print section layout in real life production plants for real life jobs for producing a print product are mostly derived unambiguously, or in a manageable number of variants from the other parameters of the print product. Also, this following step of the method according to the invention can thus be easily automated. The purely algebraic summation of the page dimensions and of the dimensions of the required border areas in running direction and in transversal direction creates a "minimum" (theoretical) format of the section to be printed, which eventually has to be consolidated with the print section formats, which are available in real production plants only as a rather restricted selection.

The method according to the invention facilitates through the structured selection of the parameters, which were not specified in the job issued by the customer for the production of the print product, initially the print section layout, then of the parameters of the required border areas and there from, of a minimum format of the section to be printed, an automated selection of a possible format of the section to be printed. When all print section formats, which are theoretically possible for producing an actual print product, wherein the number of said formats is typically limited in real graphic production plants, are determined, thus on this basis, the selection of a print section format, which is optimal under manufacturing and process points of view and economic points of view, can be easily automated.

In the context of a method according to the invention, a printing element is preferably disposed in a required border area, which abuts to an edge of the signature, so that it overlaps into a cut off area on the signature, wherein a width of the required border area transversal to the edge is determined, so that the printing element maintains a safety distance to a page adjacent to the cutoff area.

The definition of a safety distance initially comprises an aspect of the experience of the person skilled in the art dealing with determining the imposing scheme. A person skilled in the art intuitively knows from a job order, which distance printing elements, like e.g. a color wedge, have to maintain from the page rim of a print product on a section to be printed. By the instruction according to the invention to define said knowledge numerically in the form of a safety distance, and to purely algebraically limit the width of the required border area downward by the width of a printing element plus said safety distance, said experience is integrated into the method according to the invention in a manner which is particularly simple to automate.

In another preferred embodiment of the method according to the invention, a non printing element is disposed in a required border area, which is adjacent to an edge of the signature, so that said element overlaps into a page on the signature, wherein the width of the required border area transversal to the edge is determined, so that the non printing element is disposed outside of a use portion of the page.

Graphical elements, in particular images or background designs, can extend in a print product up to the edge of a page and can even be continued beyond the edge on an adjacent page. If the print is to end directly at a cut edge, the printing is thus performed during the production of the print product initially beyond said edge, and the print is "precut", when the cutoff area is separated. Quite frequently, however, the printed use portion is smaller than the page format of a print product. For example, in the view of the user, for esthetical and ergonomical reasons, during production for technical reasons, use portions with text in books and magazines are typically surrounded on all edges of a page by a circumferential, not imprinted border.

Said non-imprinted rim border can receive non-printing elements, in particular "handlers" for printing-, folding- and cutting machines, so that the width of the cutoff area is not unnecessarily increased. The method according to the invention facilitates the consideration of such non-imprinted border areas by simply algebraically adding the distance from the edge of the page to the use portion to the width of the border area required on the section to be printed, and limiting the sum by the width of the non-printing element.

In a particularly preferred manner, the print section layout is selected from a list of print section layouts in the context of the method according to the invention. The number of print section layouts technically possible and economically feasible in a graphic production plant is typically limited. Based on information regarding the available execution systems, in particular preprint systems, printing-, folding-, cutting- and binding machines, a list of said print section layouts can be generated and can be provided as a basis of a method according to the invention.

In another preferred manner, the format of the section to be printed is selected in the context of a method according to the invention from a list of available print section formats. Also, the number of technically possible and economically usable print section formats is limited in real life graphic production plants. Initially, the largest format is specified by the available plate setters and print presses, and the smallest format is specified by the page format of the print product. The use of formats, which are in stock, is economically useful in particular for small runs, or while avoiding cutoff, the use of integer portions of existing formats. Based on said information, a list of available print section formats can be generated and can be provided as a basis of a method according to the invention. Preferably, in the context of a method according to the invention for determining the longitudinal and transversal dimensions of the technically required border areas, initially from the parameters of the print product and from parameters of execution systems, provided for the production, a required type and position of border areas and a required type and position of printing and non-printing elements is determined on the section to be printed. The type and position of required border areas and of printing and non-printing elements is substantially specified by the parameters of the print product and of the execution systems. For example, in the print mode “esthetic and reprint”, with automated turning of the section to be printed, machine handlers, thus non-imprinted surfaces where the sheet can be gripped, are required at opposite edges of the section to be printed for the print machines. Automated reader units integrated into the print presses require a precisely defined type and position of color- and grayscale calibration elements, sequencing systems for print plates require their designation with man-readable text or barcodes at precisely defined positions.

Parameters, which are specified for a print product, are in particular the type of binding (thread stitching, glue- or ring binding) and the folding type (cross-fold, parallel- or mixed fold). For execution systems in a networked graphic production, thus in particular pre-print systems, print-, fold-, and cutting machines, the required border areas are in particular foldovers, contact cutoffs and milling borders. Printing elements are in particular color and grayscale calibration elements, handler-, flutter-, fold- and cutting marks.

For each possible print section format, and thus also for each print section format selected according to the invention, a manufacturing cost, which can be calculated, is determined in an actual graphic production plant, e.g. through the respectively used folding- and breaking pattern, and by specifications or implications to use certain folding- and cutting machines and paper qualities, and for using particular execution systems. Through these cost components, a supplemental ranking according to cost and manufacturing criteria of section formats to be printed can be performed according to the invention already early on, and an optimum print section format can be selected.

A comparison of the possible print section formats can be performed from a cost point of view according to the very important criterion of paper cutoff created: The cutoff substantially comes out as the difference between the sum of the area of the usable portions and the area of the print section format. Additionally, also other economically relevant factors can be considered in this comparison, in particular sourcing and storage costs, storage capacities and maximum storage times of a particular paper, restrictions with respect to the machines to be used in production, and actual capacity loading of the possible machines in the context of scheduling up to cost for external (partial) processing and to contractual premiums, when maintaining deadlines or contractual penalties when failing to maintain deadlines. Next to the automated selection of a possible print section format, the invention, compared to known manual methods, facilitates the determination of all possible formats at a reasonable complexity, and their automated comparison from an economic point of view with a reasonable complexity.

Based on the known method for determining a register sheet by manual selection of an imposing scheme from a library, it is proposed according to the invention, that initially the format of the section to be printed is selected according to one of the previously described methods, and that subsequently a longitudinal oversize, thus a difference between the longitudinal dimension of the print section format, and the minimum longitudinal dimension is added to the minimum longitudinal dimensions on a percentile basis and/or a transversal oversize, thus a difference between the transversal dimension of the print section format and the minimum transversal dimension is added to the transversal dimensions of the required border areas on a percentile basis.

By distributing the excess length and -width of the print section format selected according to the invention, relative to the “minimum” print section format, the tolerances in the manufacturing process for the print product are increased, and thus the error propensity in the production of the print product, e.g. through slight translational displacements of cuts between signatures, or when positioning mechanical grippers, is reduced. Overall, thus technical reserves in the form of paper oversize are being used in an optimum manner to improve the production process and the production cost.

DETAILED DESCRIPTION OF A PREFERRED EMBODIMENT

Figure 2:
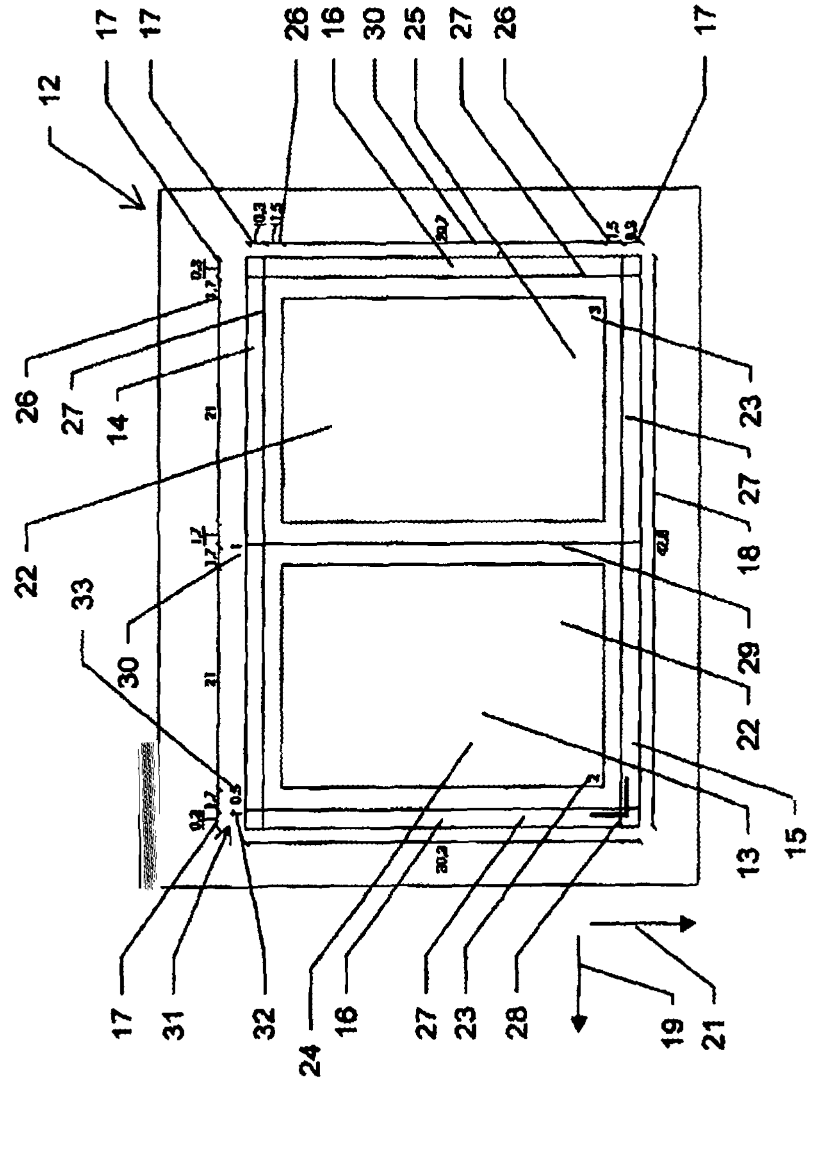
Figure 3:
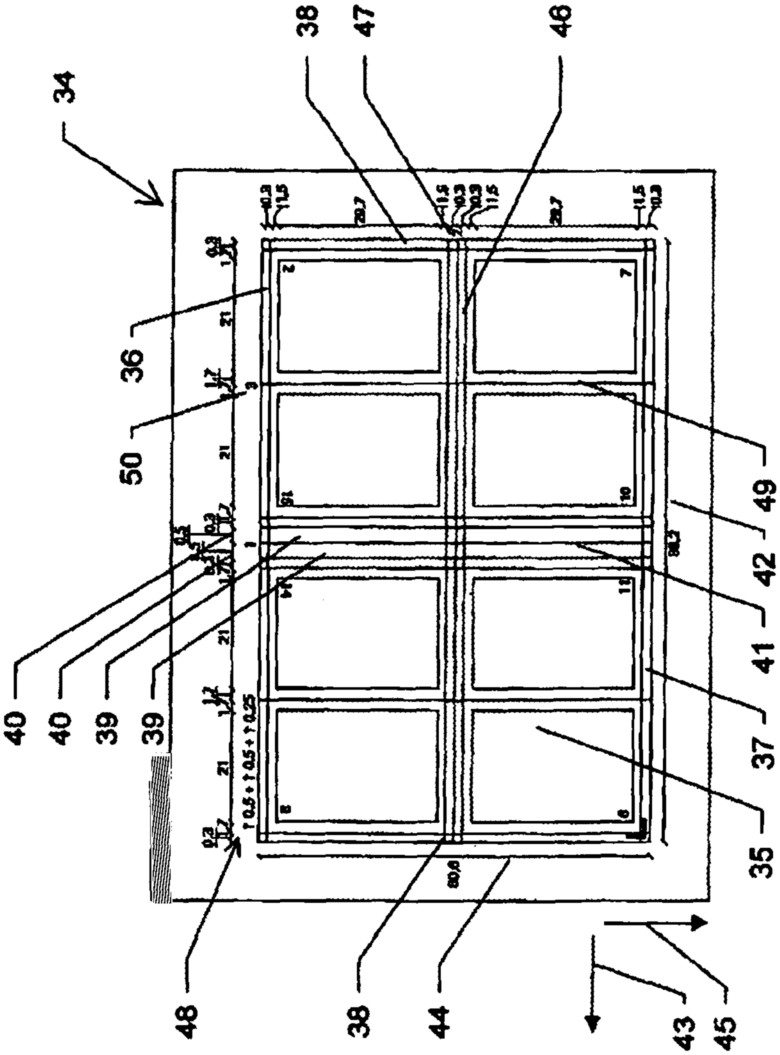
Figure 4:
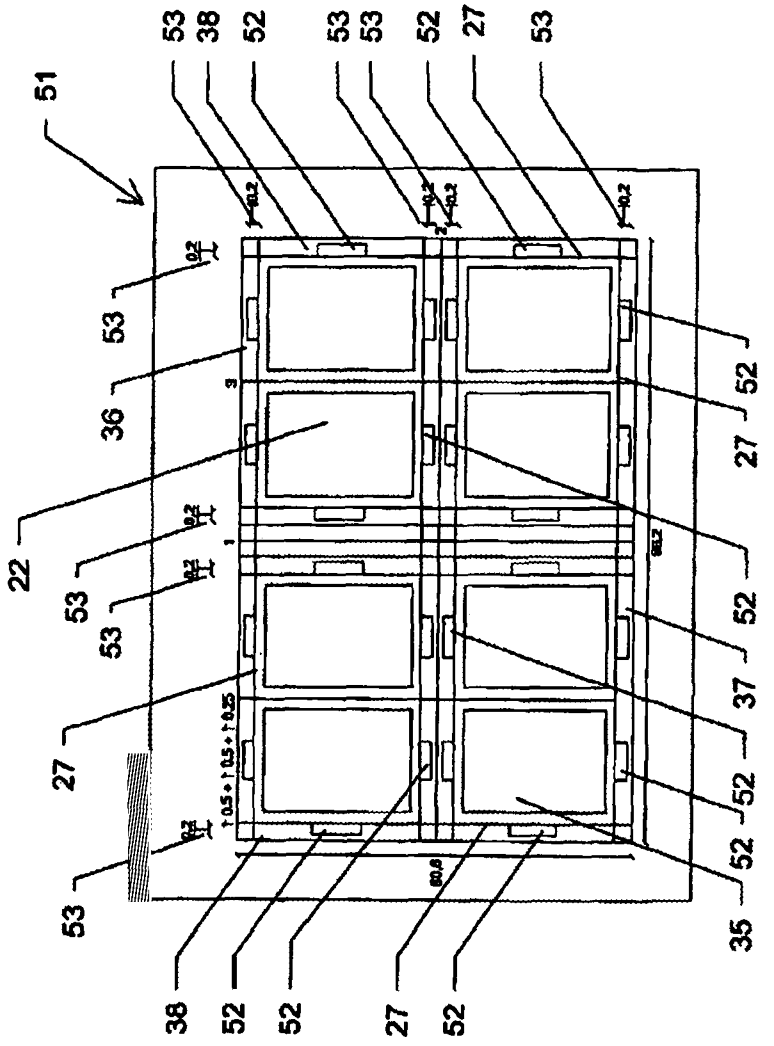
Figure 5:
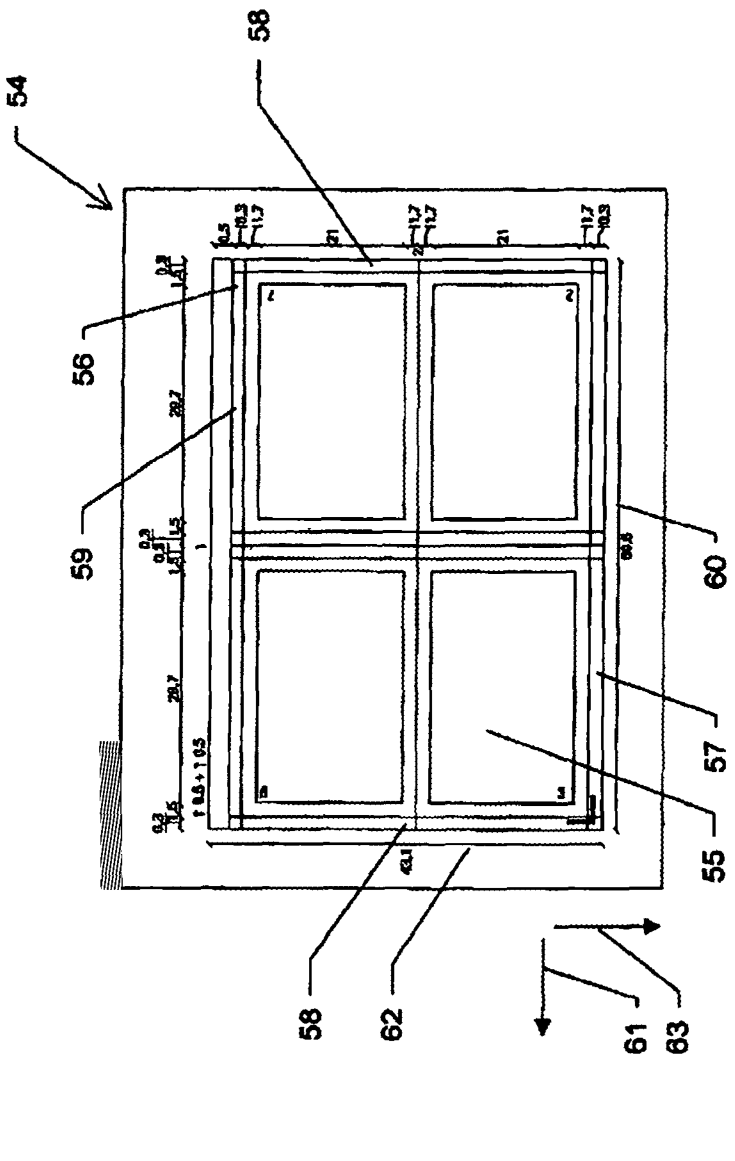
Figure 6:
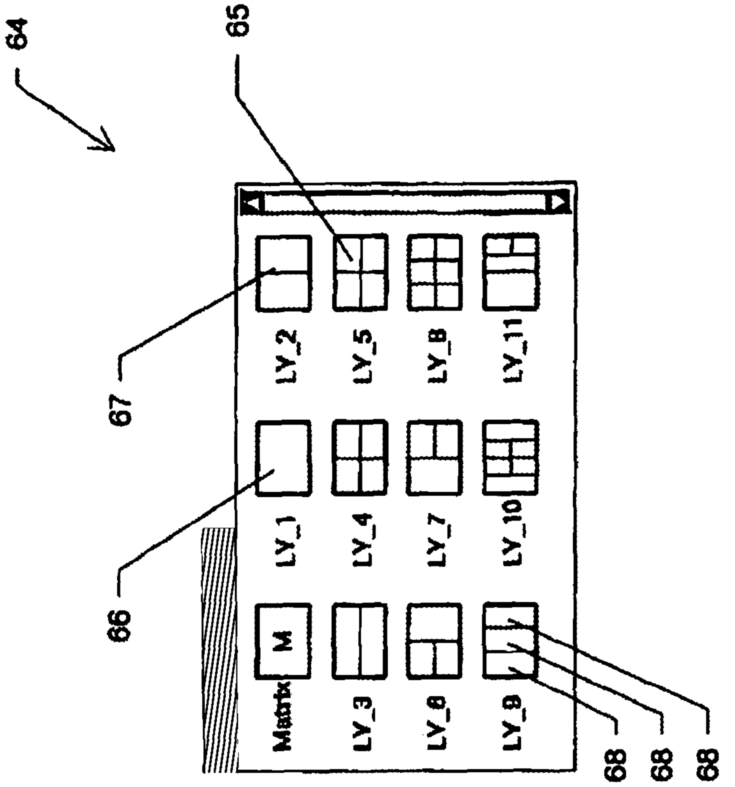
Figure 7:
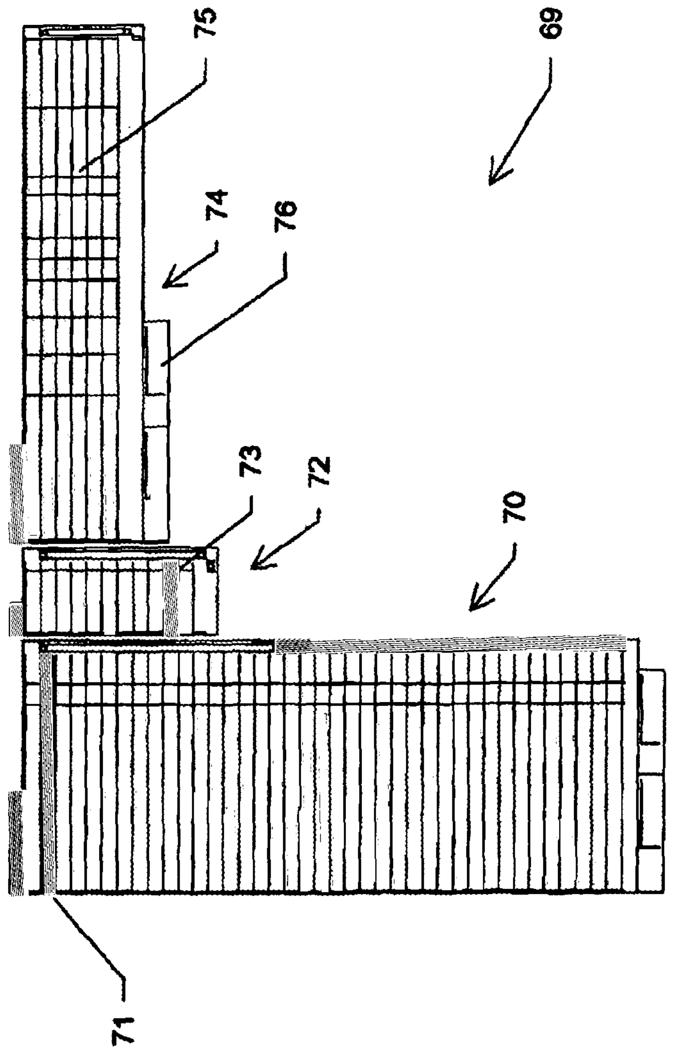
Figure 8:
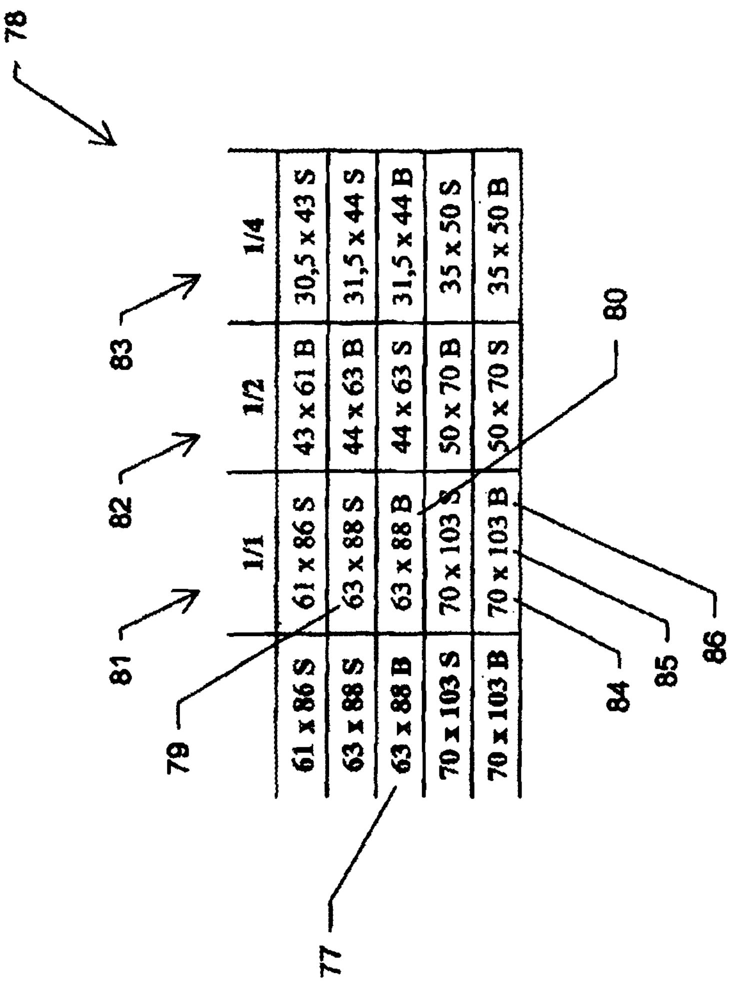
Figure 9:
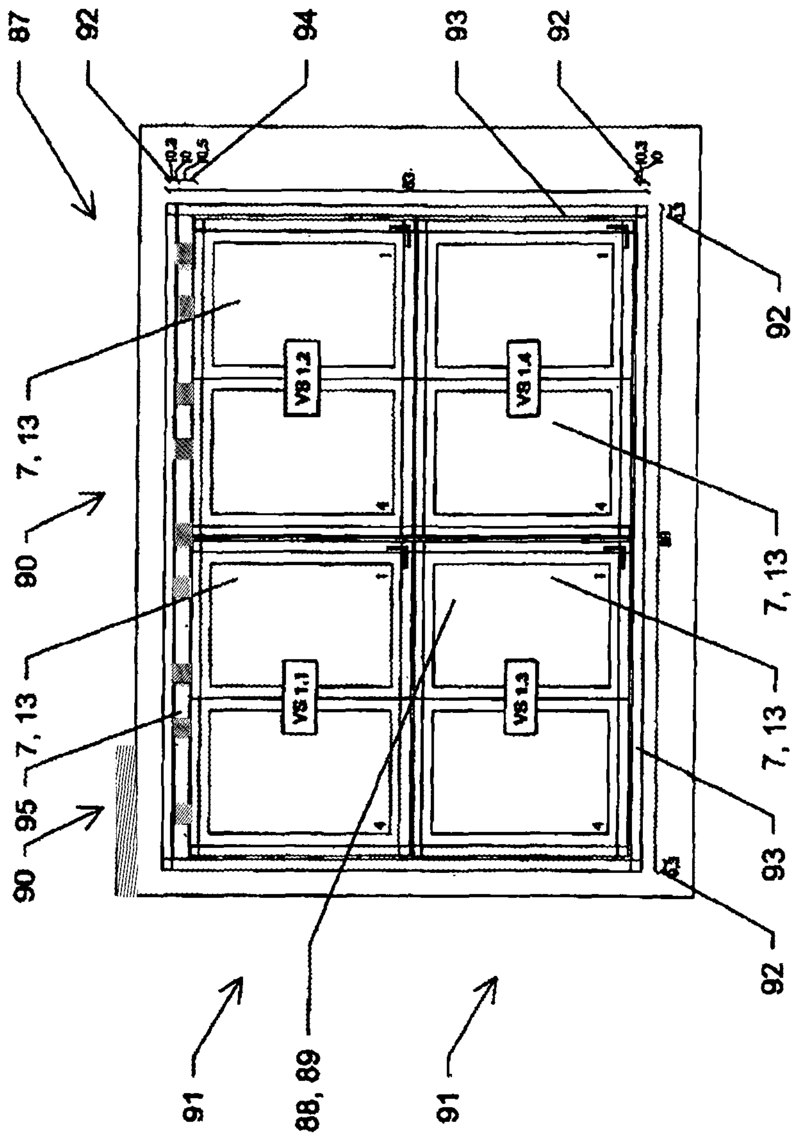
Figure 10:
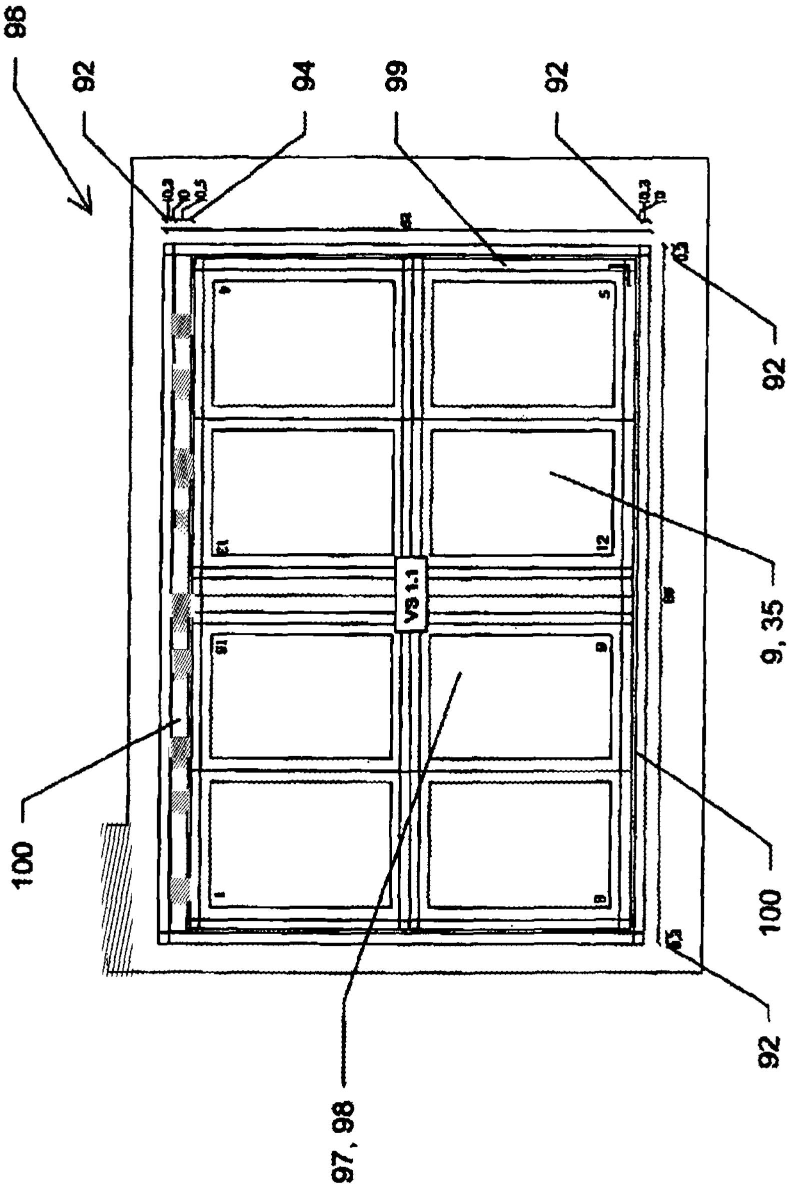
Figure 11:
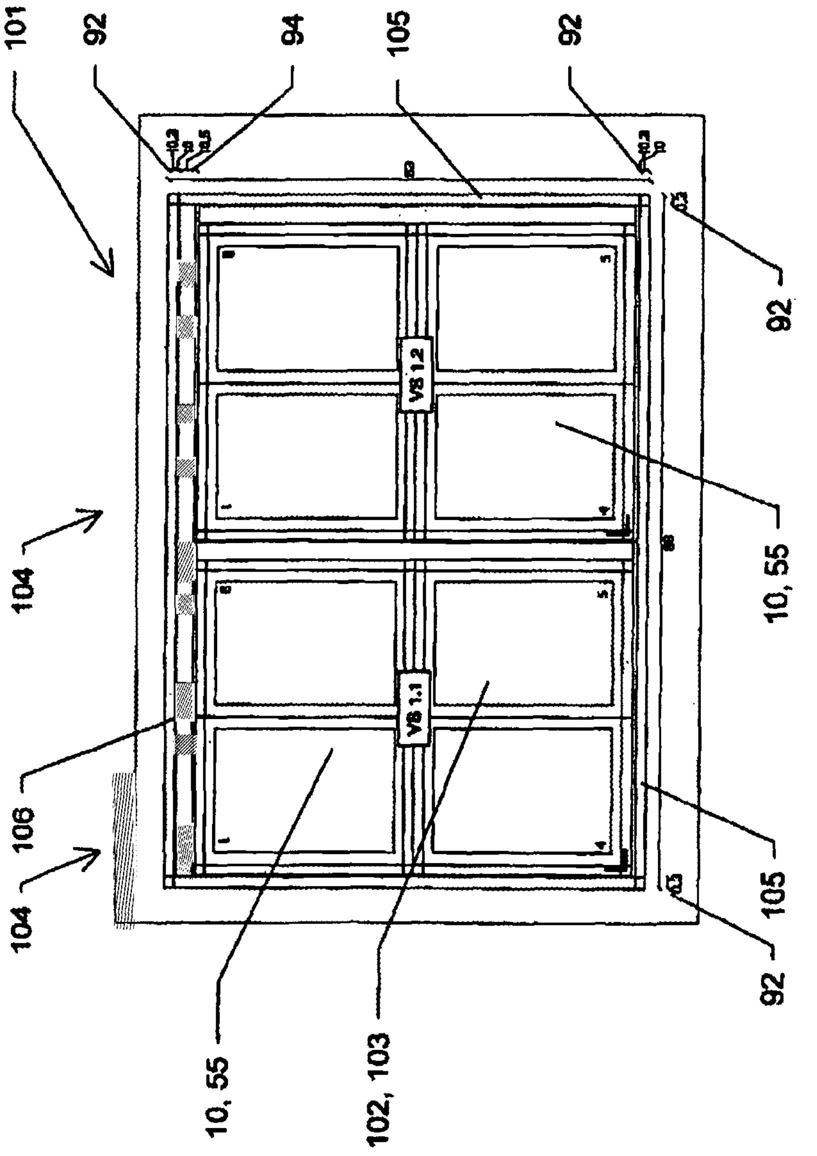

The method according to the invention is subsequently described in an exemplary manner based on the determination of the imposing scheme for producing a print product in an offset print shop. The offset print shop has a customer inquiry regarding the conditions of producing a print product. A management information system (MIS) is installed in the print shop for integrated production planning and control. Besides other modules, the MIS comprises a costing module, which supports the generation of a quote for producing a print product. The figures show in:

FIG. 1 a first screen detail;
FIG. 2 a first screen detail;
FIG. 3 a third screen detail;
FIG. 4 a fourth screen detail;
FIG. 5 a fifth screen detail;
FIG. 6 a sixth screen detail;
FIG. 7 a seventh screen detail;
FIG. 8 a table of available print section formats;
FIG. 9 an eighth screen detail;
FIG. 10 a ninth screen detail;
FIG. 11 a tenth screen detail; and
FIG. 12 an eleventh screen detail of the user interface of the costing module on the screen of a computer workstation, at which a user of the MIS initiates and observes a method according to the invention from the definition of the print job to the completion of the determination of the imposing scheme.

The screen detail 1 according to FIG. 1 initially shows a template 2, in which the user has manually defined parameters of the print product 6 according to the request of the user: The inquiry relates to the print production of 100,000 units of a wire stitched print product 6 "brochure", in portrait format DIN A4 (21×29.7 cm), folded along the long edge. The print product 6 is to be imprinted on both sides, and in four colors all the way through, wherein, and this is encoded in the table by the color selection 3 "4-4-4", the same four colors are used respectively for the front- and backside of the section to be printed. The print is not cut, the distance between the use area available for the print and the edges of the paper is at the header and at the footer of the page 1.5 cm respectively, and at the lateral borders 1.7 cm respectively, and is to be performed with the quality "image print, almost wood-free" type "Sprint image print". For the 24-page content of the brochure, paper with a grammage of 115 g/m$^2$ shall be used, and for the cover double-stroked high gloss paper with a grammage of 170 g/m$^2$ shall be used. The text of screen detail 1 has been omitted from FIG. 1.

After the definition of the parameters of the print product 6 is completed, the user has operated a user interface in the screen view 1 by means of a mouse connected to the workstation, after which an "autopilot", implemented in the MIS, initially automatically determines a proposal for a tree structure 5 of the print product 6, and illustrates said proposal below the template 2. The proposal for the tree structure 5 is based on a configuration file, which is stored in the MIS and which includes a list of possible partitions, which, among other things, is sorted based on the parameters of the product components "cover" 7 and "content" 8 of the print product 6 according to manufacturing complexity. In the context of the production of a print product 6, a unit of pages, quasi the undividable "atom", of the print product 6 is designated as "partitioning". A partitioning comprises at the most the dimensions of the section to be printed, and comprises at the most the same number of pages as said section to be printed. Herein, the "autopilot" proposes the production of the content 8 of the print product 6 in two partitions 9, 10 with 16 and 8 pages, and of the cover 7 in a partition 11 with 4-pages. The screen detail 12 according to FIG. 2 shows a proposal automatically determined by the MIS in a dimensioned illustration for a signature 13 for producing the cover 7. The proposal for the signature 13 is in turn based on a configuration file, stored in the MIS, which, depending on the parameters of the print product 6, includes the type and minimum size of the required cutoff for any possible partition 9, 10, 11. From this list, the MIS has derived the present proposal, based on the parameters according to the request.

According to the proposal of the MIS for the 4-page partition 11 of the cover 7, a contact section 14 (highlighted red on the screen), an opposite contact section 15 (highlighted green) and two side sections 16 (highlighted yellow) with widths 17 of 0.3 cm, each (printed blue) are defined. This yields for the signature 13, a minimum longitudinal dimension 18 (printed red) of 42.6 cm in the running direction 19 of the section to be printed, and a minimum transversal dimension 20 (also printed red) of 30.3 cm in the transversal direction 21. Furthermore, in the screen detail, the pages 22 are provided with page numbers 23, the use portions 24, 25 to be imprinted are marked (highlighted gray) on the pages 22, whose distances 26 to the edges 27 of the pages 22 are each dimensioned (printed blue). The fold contact is identified by a (red) marker 28, the fold 29 is drawn in blue and provided with a green number 30, and described in a legend 31 by an arrow 32, pointed upward, and by a green designation 33, as a "fold upward at half of the page". In order to characterize the page 22, which "remains in place" according to the specified fold type, its use portion 25 is furthermore emphasized by a darker marking in a manner which is not shown in the drawing figure. In the screen detail, the contact sections, opposite contact sections and side sections 14, 15, 16 are illustrated with significantly increased width relative to the pages 22. This non-proportional depiction facilitates the intuitive optical detection of the position of the cutoffs in the context of the entire signature 13 for the user of the MIS.

The screen detail 34 according to FIG. 3 shows in a dimensioned illustration a proposal, in turn automatically determined by the MIS based on the configuration file, for a signature 35 for producing a 16-page partition 9 of the content 8. The illustration corresponds to the illustration of the signature 13 according to FIG. 2. According to the proposal of the MIS for the 16-page partition 9 of the content 8, in addition to the contact cutoff 36, opposite contact cutoff 37 and side cutoffs 38, a fold over 39 with a width 40 of 0.5 cm is defined respectively on both sides of the first fold 41. This yields a minimum longitudinal dimension 42 for the signature 35 of 84.2 cm in running direction 43 of the section to be printed and a minimum transversal dimension 44 of 60.6 cm in the transversal direction 45. The second fold 46, extending in running direction 43, is provided with a red number 47 and described in a legend 48 as "fold upward at the half-page", and the third fold 49, in turn extending transversal to the running direction 43, is provided with a green number 50 and described in the legend as "fold upward at the quarter page".

The screen detail 51 according to FIG. 4 shows the signature 35 of FIG. 3 in another dimensioned illustration, wherein within the contact section 36, the opposite contact section 37 and lateral cutoffs 38, respectively adjacent to the edges 27 of the pages 22, a safety margin, which is circumferential along the edges 27, is symbolically depicted by rectangular markers 52 at a width 53 of 0.2 cm. Relative to the illustrations in the above mentioned screen details 1, 34, the contact cutoff 36, the opposite contact cutoff 37 and the side cutoffs 38, and within the above, the markers are again depicted significantly widened in order to facilitate the intuitive detection of the position of the safety area.

The screen detail 54 according to FIG. 5 shows in a dimensioned illustration a proposal for a signature 55, determined by the MIS for producing the 8-page partition 10 of the content 8. The illustration, in turn, corresponds to the one in FIG. 2. Also for the 8-page partition 10 of the content 8, a fold over 59 is defined in addition to the contact cutoff 56, the opposite contact cutoff 57, and lateral cutoffs 58. This yields for the signature 55 a minimum longitudinal dimension 60 of 60.6 cm in the running direction 61 of the section to be printed, and a minimum transversal dimension 52 of 43.1 cm in the transversal dimension 63.

The screen detail 64 according to FIG. 6 shows a selection of print section layouts 65, 66, 67, in turn specified and stored in a configuration file in the MIS, which are respectively divided by lines and columns into units 68. The units 68 of a print section layout 65, 66, 67 can thus correspond to the equally sized "fields", when divided into rows of equal height and columns of equal width. They can, however, also comprise different sizes by combining adjacent fields within a print section layout 65, 66, 67. Besides the capability to code print section layouts 65, 66, 67 in the configuration file in a text format, the MIS provides a graphic user interface, which is not illustrated in more detail, for generating and manipulating print section layouts 65, 66, 67.

For selecting a print section layout for producing one of the signatures 13, 35, 55 for the print product 6, the MIS consecutively selects each of said print section layouts 65, 66, 67 and assigns a signature 13, 35, 55 to each unit 68 of the respectively selected print section layout 65, 66, 67. According to the print type "face and reverse printing", specified in the request, all signatures 13, 35, 55 are oriented in the same manner, so that the front pages of all signatures 13, 35, 55 are disposed on the same side of the respective section to be printed. The MIS derives from the configuration file stored therein, that on each section to be printed at the long edges respectively a handler of at least 0.3 cm and at the short edges a side border of also at least 0.3 cm is disposed, thus overall, a circumferential border area with a width of 0.3 cm, and at one of the longitudinal edges additionally, due to the selected coloring and as a quality specification, a color calibration stripe with a width of at least 0.5 cm has to be provided.

The MIS determines the resulting widths of the non-printed areas along the edges of the respective section to be printed. According to the inquiry, the distance 26 between the use portion 24, 25 and the edge of the ready cut print product 6 at the page header and footer is respectively 1.5 cm and at the side borders respectively 1.7 cm. The signatures 13, 35, 55 proposed by the MIS according to the FIGS. 2 through 5 comprise contact cutoffs 14, 36, 56, opposite contact cutoffs 15, 37, 57 and lateral cutoffs 16, 38, 58 of 0.3 cm respectively. The signature 55 for producing the 8-page partition 10 of the content 8 according to FIG. 5 comprises an additional fold over 59 of 0.5 cm.

The MIS supports the automated variation of the running direction of signatures 13, 35, 55 on a section to be printed. For this purpose, each signature 13, 35, 55, and thus the running direction of the paper on each of the pages 22, included in the signature 13, 35, 55 of the print product 6, can be alternatively disposed rotated by 90° on each unit 68 of each print section layout 65, 66, 67. According to the present request, however, in the MIS, the variation of the running direction is excluded for the production of the cover 7 and also for the production of the content 8, so that the additionally possible alternatives are not considered.

The screen detail 69 according to FIG. 7 illustrates a proposal determined by the MIS for selecting a raw section for producing the cover 7 for the print product 6, which is based on a list, in turn, stored in a configuration file in the MIS, structured according to quality, grammage and paper grade of the raw sections used in the offset print shop for the production of the print product. For the cover 7, the MIS initially selects, based on the parameters defined in the request, the available quality 71 "image print almost wood free, gloss, double coated" from a list 70, and from another list 72, the grammage 73 "170 g/m$^2$" available for said quality 71. According to the specified parameters, the MIS then only displays those raw sections in a third list 74 as available raw sections 75, which correspond to the filter 76 "Sprint image print" with respect to the paper grade. The text of screen detail 69 has been omitted from FIG. 7.

With respect to the formats 77 of the raw sections 75, available for the production of the cover 7 according to FIG. 7, the MIS respectively determines the available print section formats 79, 80 according to the table 78 in FIG. 8. With respect to the formats 77 of the raw sections 75, the print section formats 79, 80, which are respectively available in the full formats 81 and as halves 82 and quarters 83 of the raw section 75. In the print section formats 79, 80, the first number 84 respectively characterizes the smaller edge dimension, the second number 85 characterizes respectively the larger edge dimension, measured in centimeters, and the terminal letter 86 characterizes the "running direction". In running direction "S" ("narrow web"), the paper fiber runs in parallel to the long edge, in running direction "B" ("wide web"), it runs in parallel to the short edge of the section to be printed.

For each of the signatures 13, 35, 55, the MIS selects, based on the respective minimum print section formats, determined for the print section layouts 65, 66, 67, the respective print section format from the available print section formats 79, 80, which, on the one hand, is not smaller than the respective minimum print section format, and during whose use, on the other hand, the cutoff is minimized, thus the percentile utilization as an area ratio of the printed signatures 13, 35, 55 and the area of the section to be printed is the maximum. Generally, the utilization of the section to be printed should be at least 80%, when using formats which are in stock, and at least 90%, when using special formats.

The print section layouts 65, 66, 67, print sections and the disposition of the signatures 13, 35, 55 on the sections to be printed can be restricted by the configuration of the MIS in different ways. For example, it can be required, depending on the grammage of the paper used, depending on the number of folds and on the type of finishing that the last fold is performed in the running direction of the paper. Arrangements of the signatures 13, 35, 55, in which said criterion is not fulfilled, are not considered then. Furthermore, depending on the print run and format of the print product 6, selected print section formats, paper qualities or print types can be preferably considered by a "bonus" or only considered in exceptional cases by a "malus". A quality requirement can furthermore include a restriction with the respect that all components or all copies of a print product 6 comprise the same running direction of the paper, or that all pages 22 on a section to be printed comprise the same alignment, so that the header of a page 22 on a signature 13, 35, 55 is not adjacent to the header of a page 22 on another signature 13, 35, 55, or a page footer is not adjacent to a page footer.

The screen detail 87 according to FIG. 9 illustrates a proposal determined by the MIS as described above for selecting a print section format 80 of the section to be printed 88 for producing the cover 7 of the print product 6 with a respective register sheet 89. The MIS proposes to print four signatures 13 according to the print section layout 65, designated as "LY_5" in FIG. 6 in two columns 90 and two rows 91 on a print section format 80 "63×88 B". A minimum longitudinal dimension (not shown) of the section to be printed results from respectively twice the minimum longitudinal dimension 18 of the signature 13 of 42.6 cm and the width 92 of the circumferential border area 93 of 0.3 cm, thus, overall, 85.8 cm. A minimum transversal dimension (which is not shown) of the section to be printed is computed as the sum of respectively 2× the minimum transversal dimension 20 of the signature 13 of 30.3 cm, and the width 92 of the circumferential border area 93, and additionally the width 94 of the color calibration stripe 95 of 0.5 cm, thus, overall, 61.7 cm. The minimum format for producing the cover 7 with this print section layout 65 thus amounts to 61.7×85.8 cm.

Out of the print section formats 79, 80, available for producing the cover 7 according to FIG. 8, only the full formats 81 of the largest four available raw sections 75 have a sufficient size. When producing four signatures 13 each, simultaneously on the print section format 79 "63×88 S" or on the print section format 80 "63×88 B", the utilization is respectively 4×30.3×42.6/(63×88)=93%. This utilization constitutes the maximum of all combinations, alternatively computed for producing the cover 7. The MIS selects the wide web format, so that the last, in case of the cover 7, the only fold extends in the running direction of the paper, and thus no folded fibers are visible from the outside along the fold.

The screen detail 96 according to FIG. 10 shows a proposal determined by the MIS, as described above, for selecting a print section format of the section to be printed 97 for producing the 16-page partition 9 of the content 8 of the print product 6 with a respective register sheet 98. The MIS proposes to print a signature 35 according to FIG. 3 according to the print section layout 66, designated as "LY_1" according to FIG. 6 (in a column and a line) on the print section format "63×88 S". A minimum longitudinal dimension (which is not shown) of the section to be printed is derived from the minimum longitudinal dimension 42 of the signature 35 of 86.2 cm and two times the width 92 of the circumferential border area 99 of 0.3 cm, overall, thus 86.8 cm. A minimum transversal dimension (which is not shown) of the section to be printed is derived from the minimum transversal dimension 44 of the signature 35 of 60.6 cm, and tow times the width 92 of the circumferential border area 99, and additionally the width 94 of the color calibration stripe 100 of 0.5 cm, overall, thus 61.7 cm. The minimum format for producing the 16-page partition 9 of the content 8 with this print sheet layout 66 is thus 61.7×86.8 cm. When producing one signature 35 on the print section format "63×88 B", the utilization is 60.6×86.2/(63×88)=94%. Said utilization constitutes the maximum of all combinations, alternatively computed for producing the 16-page partition 9 of the content 8.

The screen detail 101 according to FIG. 11 shows a proposal, determined by the MIS, as described above for selecting a print section format 102 for producing the 8-page partition 10 of the content 8 of the print product 6 with a corresponding register sheet 103. The MIS proposes to print a signature 55 according to FIG. 5 according to the print section layout 67, designated "LY_2" in FIG. 6 in two columns 104 (and one row), again on the print section format "63×88 S". A minimum longitudinal dimension (which is not shown) of the section to be printed is computed from two times the minimum transversal dimension 52 of the signature 55 of 43.1 cm, and the width 92 of the circumferential border area 105 of 0.3 cm, thus, a total of 86.8 cm. A minimum transversal dimension (which is not shown) of the section to be printed is derived from the minimum longitudinal dimension 60 of the signature 55 of 60.6 cm and two times the width 92 of the circumferential border area 105, and additionally the width 94 of the color calibration stripe 106 of 0.5 cm, overall, thus 61.7 cm. The minimum print section format for producing the 8-page partition 10 with this print section layout 67 is thus 61.7×86.8 cm. When producing two signatures 55 simultaneously on the print section format "63×88 B", the utilization is 2×43.1×60.6/(63×88)=94%. This utilization constitutes the maximum of all combinations, alternatively computed for the production of the 8-page partition 9 of the content 8.

Subsequent to the selection of the print sheet format, the MIS inserts additional printing elements, in particular cutting-, folding- and flutter marks on the print sections as required according to the parameters of the print product 6, and simultaneously automatically distributes the technically non-required oversize's of the selected formats relative to the minimum formats in the cutoffs for reasons of optimization of production process and cost. In the context of said method, designated as "balancing", the MIS possibly also considers the possibility to position printing elements, so that they overlap into the cutoff areas of the signatures 13, 35, 55, when maintaining the safety distance to the pages 22. Herein, the MIS also modifies the dimensions of the signatures 13, 35, 55 relative to the initial proposals, wherein certain parameters are fixated for technical reasons, or restricted with respect to changes. For example, all contact cutoffs 14, 36, 56 of the signatures 13, 35, 55 of a print product 6 have to have the same width. The machine handlers can overlap with non-printed border areas of the signatures 13, 35, 55, in particular with foldovers 39, 59, and with the pages 22, but must not overlap into portions to be imprinted.

In the context of the "balancing", different objectives with possibly different results can be defined (e.g. "high quality" or "normal"). During balancing, among other things, it can also be considered automatically that the dimensions of the signatures 13, 35, 55 are minimal, or the distance 26 between the edge of the section to be printed and the imprinted use-portion 24, 25 is shall be maximized, and that for the dimensions of the elements on the signature 13, 35, 55 minimum- and maximum values, e.g. for foldovers 39, 59 of 5 to 15 mm and cutoffs of 3 to 10 mm have to be maintained.

The screen detail 107 according to FIG. 12 initially shows again the template 2 of FIG. 1 with the parameters manually defined by the user, and below the template 2, the tree structure 5 of the print product 6 of FIG. 1 over the product components to the partitions 9, 10, 11. After the completion of the "autopilot", the MIS supplements said illustration seamlessly by a flowchart 108 for the production of the print product 6 according to a process node schedule by initially assigning the partitions 9, 10, 11 to the printing process 109 of the particular sections to be printed, which are subsequently divided into partial sections by the cutting process 110 as far as necessary, and transferring them as signatures (13, 35, 55 according to the figures) through folding processes 111 to a joint format and eventually joining them by stitching processes 112 (including final cutting) in the collation folder into the print product 6 as a final product. The text of screen detail 107 has been omitted from FIG. 12.

Figure 12:
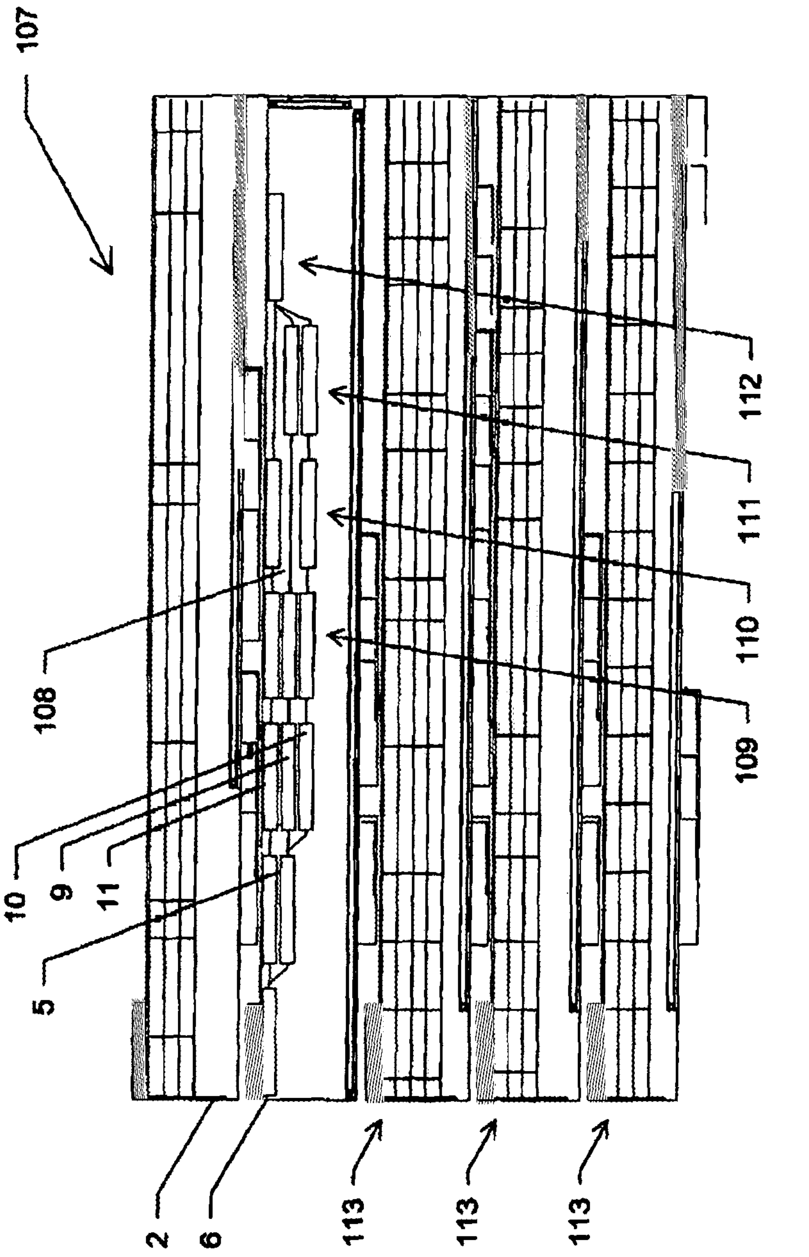

The screen detail 107 according to FIG. 12 furthermore includes overviews 113 of the data of the sections to be printed with respect to the partial- and fold sheets and for final processing of the print product 6, which allow the user of the MIS an overview of all relevant data of the suggested manufacturing process for answering customer requests, e.g. in a telephone conversation with the customer. Furthermore, the user of the MIS has the option anytime to interfere with the computation of the proposals to manually specify particular values, as e.g. the selection of a particular raw section or the disposition and alignment of the signatures on the sections to be printed, and to continue the computation with the specifications thus changed.

What is claimed is:

1. A method for producing a print product including selecting a print section format for a section to be printed having at least one signature, the steps comprising:

selecting, by a processor, a print section layout that divides the section to be printed in a running direction and in a transversal direction into adjacent units;

assigning the at least one signature which includes pages in a page format of the print product to a unit of the adjacent units;

determining border regions outside of the at least one signature, longitudinal dimensions in a running direction of the at least one signature, and transversal dimensions in a transversal direction of the at least one signature, wherein at least one of the border regions adjoins an adjacent border region for an adjacent page;

implementing a fold-over outside of at least one of the border regions;

calculating an optimal longitudinal dimension from the sums of the longitudinal dimensions and the border regions adjoining in the running direction, the fold-over outside of at least one of the border regions in the running direction, and a percentage of a difference between a longitudinal dimension and a minimum longitudinal dimension;

calculating an optimal transversal dimension from the sums of the transversal dimensions and the border regions adjoining in the transversal direction, and a percentage of a difference between a transversal dimension and a minimum transversal dimension; and selecting the print section format so that the longitudinal dimension of the print section format is at least equal to the optimal longitudinal dimension and the transversal dimension of the print section format is at least equal to the optimal transversal dimension;

imprinting the section to be printed;

collating the at least one signature for the imprinted section; and cutting the imprinted and collated section into page format to form the print product.

2. A method according to claim 1, cutting the section to be printed to a signature size of the at least one signature.

3. A method according to claim 1, wherein a printing element is disposed in a border region adjoining an edge of the at least one signature so that it overlaps in a cutoff area on the at least one signature, and wherein a width of the border region is defined transversal to said edge so that the printing element maintains a safe distance to a page adjoining the cutoff area.

4. A method according to claim 1, wherein a non-printing element is disposed in a border region adjoining an edge of the at least one signature so the element overlaps onto a page on the at least one signature, and wherein the width of the border region transversal to the edge is determined so that the non-printing element is disposed outside of a use portion of the page on the at least one signature.

5. A method according to claim 1, wherein the print section layout is selected from a list of print section layouts.

6. A method according to claim 1, wherein the determining the longitudinal dimensions and transversal dimensions of the border regions is determined from parameters of the print product and from parameters of execution systems, a type and position of the border regions, and a type and position of printing and non-printing elements.

7. A method according to claim 1, further comprising:

determining a longitudinal excess dimension or a transversal excess dimension for a register sheet, wherein the longitudinal excess dimension is a percentage of the optimal longitudinal dimension plus the difference between the longitudinal dimension and the minimum longitudinal dimension, and wherein the transversal excess dimension is a percentage of the border regions plus the difference between the transversal dimension and the minimum transversal dimension.

8. A method according to claim 1, wherein the print section layout is partitioned such that the at least one signature has at least 8 pages on one side of the print section layout.

9. A method according to claim 1, further comprising:

calculating the optimal transversal dimension from the sums of the transversal dimensions and the border regions adjoining in the transversal direction, the percentage of the difference between the transversal dimension and the minimum transversal dimension, and a width of a color calibration stripe disposed adjacent one of the border regions adjoining in the transversal direction.

10. A method for producing a print product including selecting a print section format for a section to be printed having at least one signature, the method comprising:

selecting, by a processor, a print section layout that divides the section to be printed in a running direction and in a transversal direction into adjacent units;

assigning the at least one signature which includes pages in a page format of the print product to a unit of the adjacent units;

determining border regions outside of the at least one signature, longitudinal dimensions in a running direction of the at least one signature, and transversal dimensions in a transversal direction of the at least one signature;

implementing a fold-over outside of at least one of the border regions;

calculating an optimal longitudinal dimension from the sums of the longitudinal dimensions and the border regions adjoining in the running direction, the fold-over outside of at least one of the border regions in the running direction, and a percentage of a difference between a longitudinal dimension and a minimum longitudinal dimension;

calculating an optimal transversal dimension from the sums of the transversal dimensions and the border regions adjoining in the transversal direction, and a percentage of a difference between a transversal dimension and a minimum transversal dimension;

selecting the print section format so that the longitudinal dimension of the print section format is at least equal to the optimal longitudinal dimension and the transversal dimension of the print section format is at least equal to the optimal transversal dimension; and imprinting the section to be printed.

11. A method according to claim 10, cutting the section to be printed to a signature size of the at least one signature.

12. A method according to claim 10, wherein a printing element is disposed in a border region adjoining an edge of the at least one signature so that it overlaps in a cutoff area on the at least one signature, and wherein a width of the border region is defined transversal to said edge so that the printing element maintains a safe distance to a page adjoining the cutoff area.

13. A method according to claim 10, wherein a non-printing element is disposed in a border region adjoining an edge of the at least one signature so the element overlaps onto a page on the at least one signature, and wherein the width of the border region transversal to the edge is determined so that the non-printing element is disposed outside of a use portion of the page on the at least one signature.

14. A method according to claim 10, wherein the print section layout is selected from a list of print section layouts.

15. A method according to claim 10, wherein the format of the section to be printed is selected from a list of available print section formats.

16. A method according to claim 10, wherein the determining the longitudinal dimensions and transversal dimensions of the border regions is determined from parameters of the print product and from parameters of execution systems, a type and position of the border regions, and a type and position of printing and non-printing elements.

17. A method according to claim 10, further comprising:

determining a longitudinal excess dimension or a transversal excess dimension for a register sheet, wherein the longitudinal excess dimension is a percentage of the optimal longitudinal dimension plus the difference between the longitudinal dimension and the minimum longitudinal dimension, and wherein the transversal excess dimension is a percentage of the border regions plus the difference between the transversal dimension and the minimum transversal dimension.

18. A method according to claim 10, wherein the print section layout is partitioned such that the at least one signature has at least 8 pages on one side of the print section layout.

19. An apparatus for producing a print product, the apparatus comprising:

a memory storing machine readable instructions to:

select a print section format for a section to be printed having at least one signature;

select a print section layout that divides the section to be printed in a running direction and in a transversal direction into adjacent units;

assign the at least one signature which includes pages in a page format of the print product to a unit of the adjacent units;

determine border regions outside of the at least one signature, longitudinal dimensions in a running direction of the at least one signature, and transversal dimensions in a transversal direction of the at least one signature;

implement a fold-over outside of at least one of the border regions;

calculate an optimal longitudinal dimension from the sums of the longitudinal dimensions and the border regions adjoining in the running direction, the fold-over outside of at least one of the border regions in the running direction, and a percentage of a difference between a longitudinal dimension and a minimum longitudinal dimension;

calculate an optimal transversal dimension from the sums of the transversal dimensions and the border regions adjoining in the transversal direction, and a percentage of a difference between a transversal dimension and a minimum transversal dimension;

select the print section format so that the longitudinal dimension of the print section format is at least equal to the optimal longitudinal dimension and the transversal dimension of the print section format is at least equal to the optimal transversal dimension; and imprint the section to be printed; and a processor to implement the machine readable instructions.

* * * * *